United States Patent
Onuma et al.

(10) Patent No.: US 12,191,544 B2
(45) Date of Patent: Jan. 7, 2025

(54) MEMBRANE ELECTRODE ASSEMBLY, ELECTROCHEMICAL DEVICE, AND ELECTROCHEMICAL SYSTEM

(71) Applicant: Panasonic Intellectual Property Management Co., Ltd., Osaka (JP)

(72) Inventors: Shigenori Onuma, Kyoto (JP); Tomohiro Kuroha, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 653 days.

(21) Appl. No.: 17/467,314

(22) Filed: Sep. 6, 2021

(65) Prior Publication Data

US 2021/0399325 A1 Dec. 23, 2021

Related U.S. Application Data

(63) Continuation of application No. PCT/JP2020/010040, filed on Mar. 9, 2020.

(30) Foreign Application Priority Data

Apr. 26, 2019 (JP) ................. 2019-086176

(51) Int. Cl.
*H01M 8/1213* (2016.01)
*H01M 4/86* (2006.01)
(Continued)

(52) U.S. Cl.
CPC ....... *H01M 8/1213* (2013.01); *H01M 4/8657* (2013.01); *H01M 4/9033* (2013.01); *H01M 8/1004* (2013.01)

(58) Field of Classification Search
CPC ............. H01M 8/1213; H01M 4/8657; H01M 4/9033; H01M 8/1004
(Continued)

(56) References Cited

U.S. PATENT DOCUMENTS

2009/0011328 A1* 1/2009 Yamaguchi ......... H01M 8/1226
429/99
2017/0288251 A1* 10/2017 Kamata .................. B01D 53/00
(Continued)

FOREIGN PATENT DOCUMENTS

CN 107406332 A 11/2017
EP 1528615 A2 5/2005
(Continued)

OTHER PUBLICATIONS

Mastrikov et al., First PrinciplesModeling of Pd-doped (La,Sr)(Co,Fe)O3 Complex Perovskites, Mar. 15, 2016, Fuel Cells 16, 2016, No. 2, 267-271 (Year: 2016).*

(Continued)

*Primary Examiner* — Christian Roldan
*Assistant Examiner* — Robert Gene West
(74) *Attorney, Agent, or Firm* — Rimon P.C.

(57) ABSTRACT

A membrane electrode assembly according to the present disclosure includes an electrolyte membrane containing a solid electrolyte and a first electrode bonded to the electrolyte membrane, wherein the solid electrolyte is a compound represented by the composition formula (1): $BaZr_{1-x}M_xO_{3-\gamma}$, M in the composition formula (1) is at least one element selected from the group consisting of Sc, Er, Ho, Dy, Gd, Y, In, Tm, Yb, and Lu, and $0<x<1$ and $0<\gamma<0.5$ are satisfied, and the first electrode contains a lanthanum strontium cobalt iron palladium composite oxide.

8 Claims, 5 Drawing Sheets

| | AIR ELECTRODE | ELECTROLYTE MEMBRANE | OHMIC RESISTANCE @0 A, 600°C [$\Omega cm^2$] | REACTION RESISTANCE @0 A, 600°C [$\Omega cm^2$] |
|---|---|---|---|---|
| EXAMPLE 1 | Pd-CONTAINING LSCF6446(LSCFPd): $(La_{0.6}Sr_{0.4}Co_{0.38}Fe_{0.57}Pd_{0.05}O_{3-\delta})$ | BZYb: $BaZr_{0.8}Yb_{0.2}O_{2.90}$ | 0.36 | 0.79 |
| COMPARATIVE EXAMPLE 1 | LSCF6446(LSCF): $(La_{0.6}Sr_{0.4}Co_{0.4}Fe_{0.6}O_{3-\delta})$ | BZYb: $BaZr_{0.8}Yb_{0.2}O_{2.90}$ | 0.37 | 1.2 |
| COMPARATIVE EXAMPLE 2 | Pd-CONTAINING LSCF6446(LSCFPd): $(La_{0.6}Sr_{0.4}Co_{0.38}Fe_{0.57}Pd_{0.05}O_{3-\delta})$ | YSZ: $[ZrO_2]_{0.92}[Y_2O_3]_{0.08}$ | 2.0 | 4.0 |
| COMPARATIVE EXAMPLE 3 | LSCF6446(LSCF): $(La_{0.6}Sr_{0.4}Co_{0.4}Fe_{0.6}O_{3-\delta})$ | YSZ: $[ZrO_2]_{0.92}[Y_2O_3]_{0.08}$ | 2.0 | 5.0 |

(51) Int. Cl.
*H01M 4/90* (2006.01)
*H01M 8/1004* (2016.01)

(58) Field of Classification Search
USPC .......................................................... 429/483
See application file for complete search history.

(56) References Cited

U.S. PATENT DOCUMENTS

| | | | |
|---|---|---|---|
| 2018/0037508 A1* | 2/2018 | Higashino | C04B 35/486 |
| 2020/0075980 A1* | 3/2020 | Ding | H01M 4/9066 |
| 2020/0212468 A1 | 7/2020 | Hiraiwa et al. | |

FOREIGN PATENT DOCUMENTS

| | | |
|---|---|---|
| EP | 3236527 A1 | 10/2017 |
| EP | 3279987 A1 | 2/2018 |
| JP | 1-014872 | 1/1989 |
| JP | 2009-035447 | 2/2009 |
| JP | 2016-100137 A | 5/2016 |
| WO | 2018/230247 | 12/2018 |

OTHER PUBLICATIONS

International Search Report of PCT application No. PCT/JP2020/010040 dated Jun. 2, 2020.
Shaoli Guo et al., "B-Site Metal(Pd, Pt, Ag, Cu, Zn, Ni) Promoted $La_{1-x}Sr_xCo_{1-y}Fe_yO_{3-\delta}$ Perovskite Oxides as Cathodes for IT-SOFCs", Catalysts, MDPI, vol. 5, Issue 1, Mar. 2015, pp. 366-391.
Extended European Search Report dated May 11, 2022 for the related European Patent Application No. 20795943.8.
Extended European Search Report dated May 12, 2022 for the related European Patent Application No. 20796410.7.
Zhou Feng et al., "Pd-doped $La0.6Sr0.4Co0.2Fe0.803$-[delta] perovskite oxides as cathodes for intermediate temperature solid oxide fuel cells", Solid State Ionics, vol. 319, Feb. 4, 2018, pp. 22-27, XP055917446.
English Translation of Chinese Search Report dated Mar. 29, 2024 for the related Chinese Patent Application No. 202080007992.4.

* cited by examiner

FIG. 1
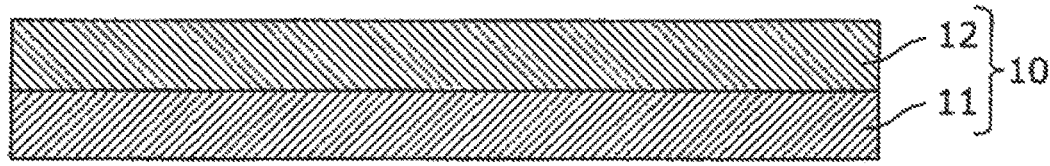
FIG. 2
| DOPANT M | IONIC RADIUS OF M [Å] | FORMATION OF BaM$_2$NiO$_5$ | CONDUCTIVITY@600°C [S/cm] |
|---|---|---|---|
| Sc | 0.745 | NO | $0.4 \times 10^{-2}$ |
| In | 0.800 | NO | $0.1 \times 10^{-2}$ |
| Lu | 0.861 | NO | $1.1 \times 10^{-2}$ |
| Yb | 0.868 | NO | $1.1 \times 10^{-2}$ |
| Tm | 0.880 | YES | $1.2 \times 10^{-2}$ |
| Er | 0.890 | YES | — |
| Y | 0.900 | YES | $1.3 \times 10^{-2}$ |
| Ho | 0.901 | YES | — |
| Dy | 0.912 | YES | — |
| Gd | 0.938 | YES | — |
FIG. 3
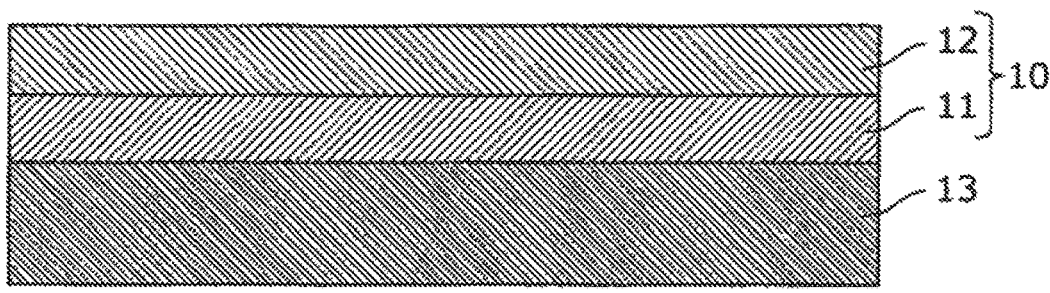

FIG. 4

| | AIR ELECTRODE | ELECTROLYTE MEMBRANE | OHMIC RESISTANCE @0 A, 600°C [Ωcm$^2$] | REACTION RESISTANCE @0 A, 600°C [Ωcm$^2$] |
|---|---|---|---|---|
| EXAMPLE 1 | Pd-CONTAINING LSCF6446(LSCFPd): (La$_{0.6}$Sr$_{0.4}$Co$_{0.38}$Fe$_{0.57}$Pd$_{0.05}$O$_{3-\delta}$) | BZYb: BaZr$_{0.8}$Yb$_{0.2}$O$_{2.90}$ | 0.36 | 0.79 |
| COMPARATIVE EXAMPLE 1 | LSCF6446(LSCF): (La$_{0.6}$Sr$_{0.4}$Co$_{0.4}$Fe$_{0.6}$O$_{3-\delta}$) | BZYb: BaZr$_{0.8}$Yb$_{0.2}$O$_{2.90}$ | 0.37 | 1.2 |
| COMPARATIVE EXAMPLE 2 | Pd-CONTAINING LSCF6446(LSCFPd): (La$_{0.6}$Sr$_{0.4}$Co$_{0.38}$Fe$_{0.57}$Pd$_{0.05}$O$_{3-\delta}$) | YSZ: [ZrO$_2$]$_{0.92}$[Y$_2$O$_3$]$_{0.08}$ | 2.0 | 4.0 |
| COMPARATIVE EXAMPLE 3 | LSCF6446(LSCF): (La$_{0.6}$Sr$_{0.4}$Co$_{0.4}$Fe$_{0.6}$O$_{3-\delta}$) | YSZ: [ZrO$_2$]$_{0.92}$[Y$_2$O$_3$]$_{0.08}$ | 2.0 | 5.0 |

FIG. 5

| | AIR ELECTRODE | ELECTROLYTE MEMBRANE | TEMPERATURE [°C] | TERMINAL VOLTAGE @0 A [V] | OHMIC RESISTANCE @0 A [Ωcm²] | REACTION RESISTANCE @0 A [Ωcm²] |
|---|---|---|---|---|---|---|
| EXAMPLE 1 | Pd-CONTAINING LSCF6446 (LSCFPd) | BZYb | 700 | 0.90 | 0.24 | 0.16 |
| | | | 600 | 0.96 | 0.36 | 0.79 |
| | | | 500 | 1.00 | 0.52 | 5.1 |
| COMPARATIVE EXAMPLE 1 | LSCF6446 (LSCF) | BZYb | 700 | 0.90 | 0.24 | 0.18 |
| | | | 600 | 0.92 | 0.37 | 1.2 |
| | | | 500 | 0.94 | 0.55 | 7.0 |
| COMPARATIVE EXAMPLE 2 | Pd-CONTAINING LSCF6446 (LSCFPd) | YSZ | 600 | 1.13 | 2.0 | 4.0 |
| COMPARATIVE EXAMPLE 3 | LSCF6446 (LSCF) | YSZ | 600 | 1.13 | 2.0 | 5.0 |

MEMBRANE ELECTRODE ASSEMBLY, ELECTROCHEMICAL DEVICE, AND ELECTROCHEMICAL SYSTEM

BACKGROUND

1. Technical Field

The present disclosure relates to a membrane electrode assembly, an electrochemical device, and an electrochemical system.

2. Description of the Related Art

For example, solid oxide fuel cells, water electrolysis cells, and steam electrolysis cells are known as electrochemical devices that include a membrane electrode assembly, which includes an electrolyte membrane including a solid electrolyte composed of a solid oxide. Oxide ion ($O^{2-}$) conductors exemplified by stabilized zirconia are widely used in solid electrolytes of the electrochemical devices. The ionic conductivity of oxide ion conductors decreases with decreasing temperature. Thus, for example, it is desirable that the operating temperature of a solid oxide fuel cell containing stabilized zirconia in a solid electrolyte be 700° C. or more.

In electrochemical devices including a solid electrolyte composed of a solid oxide, such as solid oxide fuel cells, however, a higher operating temperature disadvantageously causes an increase in the total cost of the system due to a heat-insulating material with higher performance or with an increased thickness, due to the necessity for an expensive special heat-resistant metal as a metal material for a structural member, or the like. High-temperature operation also causes problems of lower reliability of the system due to higher probability of cracking caused by the difference in thermal expansion of constituents during starting or stopping and problems of longer start times and increased energy. Thus, a decrease in the operating temperature of an electrochemical device that includes a solid electrolyte composed of a solid oxide is one of main objects in the practical application of the electrochemical device.

Shaoli Guo et. al., "B-Site Metal (Pd, Pt, Ag, Cu, Zn, Ni) Promoted La1-xSrxCo1-yFeyO3-δ Perovskite Oxides as Cathodes for IT-SOFCs", Catalysts, MDPI, 2015, Vol. 5, Issue 1, pp. 366-391 discloses an electrochemical device that includes a solid electrolyte layer layered body in which an electrochemical cell is formed by using a lanthanum strontium cobalt iron compound containing palladium (Pd) as an air electrode capable of lowering the operating temperature, $Ce_{0.9}Gd_{0.1}O_{1.95}$ as a reaction prevention layer for preventing a reaction promoted by a contact between an electrolyte and the air electrode, 8% by mol yttria ($Y_2O_3$) doped zirconia as an electrolyte membrane, and a cermet that is a mixture of nickel (Ni) and yttria-doped zirconia as a fuel electrode to supplement activity at 600° C. to 800° C., that is, a membrane electrode assembly in which the air electrode and the electrolyte membrane are combined.

SUMMARY

Electrochemical devices including a known membrane electrode assembly, however, have insufficient power generation efficiency at a low temperature of 600° C. or less.

One non-limiting and exemplary embodiment provides a membrane electrode assembly and the like that can improve power generation efficiency.

In one general aspect, the techniques disclosed here feature a membrane electrode assembly that includes an electrolyte membrane containing a solid electrolyte and a first electrode bonded to the electrolyte membrane, wherein the solid electrolyte is a compound represented by the composition formula (1): $BaZr_{1-x}M_xO_{3-y}$, M in the composition formula (1) is at least one element selected from the group consisting of Sc, Er, Ho, Dy, Gd, Y, In, Tm, Yb, and Lu, and $0<x<1$ and $0<y<0.5$ are satisfied, and the first electrode contains a lanthanum strontium cobalt iron palladium composite oxide.

A membrane electrode assembly and the like according to the present disclosure can improve power generation efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic cross-sectional view of a membrane electrode assembly according to a first embodiment;

FIG. 2 is a table of the properties of BZMs containing various dopants;

FIG. 3 is a schematic cross-sectional view of a cell according to a second embodiment;

FIG. 4 is a table of materials used and the measurement results of ohmic resistance and reaction resistance at 600° C. of membrane electrode assemblies for evaluation according to Example and Comparative Examples 1 to 3;

FIG. 5 is a table of materials used and the measurement results of terminal voltage, ohmic resistance, and reaction resistance at different temperatures of the membrane electrode assemblies for evaluation according to Example and Comparative Examples 1 to 3;

DETAILED DESCRIPTION

Figure 6:
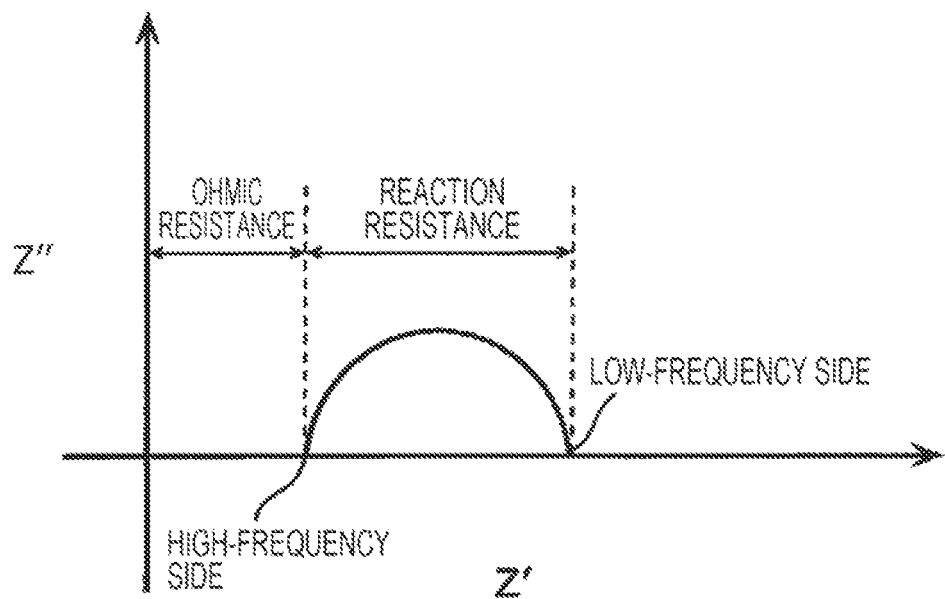
FIG. 6 is a Cole-Cole plot of an example of an alternating-current impedance measurement.

Underlying Knowledge Forming Basis of the Present Disclosure

When a membrane electrode assembly including a lanthanum strontium cobalt iron palladium compound (hereinafter referred to as an "LSCFPd") as an air electrode and yttria-doped zirconia (hereinafter referred to as a "YSZ"), which is a solid electrolyte with oxide ion conductivity, as an electrolyte membrane is used at approximately 600° C., the ionic conduction of the solid electrolyte is overwhelmingly larger than the electronic conduction of the solid electrolyte. Thus, when an electric device including the membrane electrode assembly has an external output current (hereinafter referred to as an "external current") of 0 A, the terminal voltage is almost equal to the voltage calculated from the Nernst equation.

More specifically, the present inventors have studied a membrane electrode assembly that has higher ionic conductivity at low temperatures than the known membrane electrode assembly disclosed in Non-patent Literature 1. As a result, the following findings were obtained. The present inventors have found that as disclosed in Non-patent Literature 1, when a membrane electrode assembly containing, in a solid electrolyte, an oxide ion conductor YSZ or ceria ($CeO_2$) partially substituted with gadolinia ($Gd_2O_3$) (hereinafter referred to as a "GDC"), such as $Ce_{0.9}Gd_{0.1}O_{1.95}$, is used in an electrochemical device (for example, a fuel cell), an air electrode containing a lanthanum strontium cobalt iron compound (hereinafter referred to as an "LSCF") and an air electrode containing a LSCFPd with higher activity than the LSCF have the same terminal voltage at an external current of 0 A.

A membrane electrode assembly containing a proton conductive solid electrolyte that operates at 500° C. to 800° C. has also been proposed. The membrane electrode assembly includes, as a solid electrolyte, yttrium-doped barium zirconate (hereinafter referred to as a "BZY") or a solid electrolyte in which yttrium of BZY is replaced with ytterbium (hereinafter referred to as a "BZYb"), and, as an air electrode, a cathode layer composed of a lanthanum strontium cobalt compound (hereinafter referred to as a "LSC"). In a membrane electrode assembly containing a proton ($H^+$) conductor exemplified by BZY or BZYb in a solid electrolyte, the hole conductivity is large enough to be comparable with proton conductivity in the solid electrolyte. Thus, the terminal voltage of an electric device including the membrane electrode assembly at an external current of 0 A differs from the theoretical voltage calculated from the Nernst equation and is lower than the theoretical voltage. The use of an air electrode material that is active in power generation improves the exchange current density at the external current of 0 A. This improves the terminal voltage at the external current of 0 A, which improves the power generation efficiency. Consequently, even at an external current of 0 A or more, the terminal voltage is improved, and the power generation efficiency is also improved.

Thus, to improve the power generation efficiency of a membrane electrode assembly containing a proton conductive solid electrolyte, it is desirable to provide a membrane electrode assembly with an improved terminal voltage at the external current of 0 A.

More specifically, when a membrane electrode assembly in an electrochemical device is composed of an air electrode containing a lanthanum strontium cobalt iron compound (hereinafter referred to as an "LSCF") and an electrolyte membrane containing a solid electrolyte represented by $BaZr_{1-x}M_xO_{3-\gamma}$, the present inventors have found the problems of a low terminal voltage at an external current of 0 A and consequently an insufficient terminal voltage and insufficient power generation efficiency even at an external current of 0 A or more. Thus, the present inventors have studied a combination of an electrode and an electrolyte membrane that can further increase the terminal voltage at an external current of 0 A and have high power generation efficiency, and have completed the present disclosure.

More specifically, the present inventors have found that a membrane electrode assembly that includes a proton conductor represented by $BaZr_{1-x}M_xO_{3-\gamma}$ (wherein $0<x<1$ and $0<\gamma<0.5$ are satisfied) in an electrolyte membrane and an LSCFPd in which cobalt and iron sites constituting an LSCF are partially substituted with palladium in an air electrode can have a higher terminal voltage at an external current of 0 A and even at an external current of 0 A or more and higher power generation efficiency even at low temperatures of 600° C. or less than a membrane electrode assembly including an air electrode formed of the LSCF and an electrolyte composed of the $BaZr_{1-x}M_xO_{3-\gamma}$.

This is because the amount of reaction resistance component at the air electrode generated between the air electrode, the electrolyte membrane, and gas at 600° C., which is lower than 700° C., and even at 500° C. is smaller in the membrane electrode assembly composed of the air electrode formed of the LSCFPd and the electrolyte membrane containing the solid electrolyte represented by the composition formula $BaZr_{1-x}M_xO_{3-\gamma}$ (wherein $0<x<1$ and $0<\gamma<0.5$, hereinafter referred to as a "BZM") than in the membrane electrode assembly composed of the air electrode formed of the LSCF and the electrolyte membrane formed of the BZM.

Furthermore, because the BZM used as the electrolyte is a proton conductor and a hole conductor, in the power generation state, an electric current caused by holes (hereinafter referred to as a "hole current") cannot be ignored compared with a current caused by protons (hereinafter referred to as a "proton current"). Thus, the proton current is the same as the hole current at the external current of 0 A, substantially creates a power generation state, and causes a deviation from the theoretical electromotive force. In the power generation state, the combination of the electrolyte composed of BZM and the air electrode changes the reaction resistance component and the reaction activity at the air electrode. Because the LSCFPd has higher reaction activity as the air electrode than the LSCF, the terminal voltage increases at the external current of 0 A and even at the external current of 0 A or more. This probably improves the power generation performance of the entire membrane electrode assembly.

When a proton conductive solid electrolyte is used, the reaction represented by the following formula (A) proceeds at the air electrode. When the proton conductive solid electrolyte BZM is used in the electrolyte membrane, and the LSCF is used in the air electrode, protons are rarely transported through the air electrode, and therefore the reaction represented by the following formula (A) probably proceeds only at a three-phase interface (that is, the interface between the electrolyte (BZM), the air electrode (LSCF), and the air). Thus, the reaction represented by the following formula (A) proceeds at the three-phase interface between the BZM containing protons, the air electrode serving as a reaction catalyst, and the air. On the other hand, due to high hydrogen-permeation and hydrogen-adsorption capacities of Pd, when the proton conductive solid electrolyte BZM is used in the electrolyte membrane, and the LSCFPd is used in the air electrode, the reaction represented by the following formula (A) is likely to proceed also at a two-phase interface (that is, the interface between the air electrode (LSCFPd) and the air). In other words, when the LSCFPd is used in the air electrode, protons can be transported through the air electrode and can exist in the air electrode, and the reaction represented by the following formula (A) can proceed widely at the two-phase interface. Thus, the use of the LSCFPd in the air electrode can greatly decrease the amount of reaction resistance component.

$$2H^+ + \tfrac{1}{2}O_2 + 2e^- \rightarrow H_2O \tag{A}$$

When YSZ or GDC with oxide ion conductivity is used in the electrolyte membrane, due to low electronic conductivity at low temperatures of 600° C., the electric current in the power generation state is almost entirely caused by oxide ions, and the terminal voltage at the external current of 0 A does not change with the activity of the air electrode.

When a solid electrolyte with oxide ion conductivity is used, the reaction represented by the following formula (B)

proceeds at the air electrode. When a solid electrolyte with oxide ion conductivity YSZ or GDC is used in the electrolyte membrane, protons are not involved in the reaction represented by the following formula (B), and the reaction proceeds at the two phase interface (that is, the interface between the air electrode and the air) regardless of the use of LSCF or LSCFPd in the air electrode. Likewise, even when the LSCFPd or LSCF is used as the air electrode, the reaction represented by the following formula (B) proceeds in the solid electrolyte with oxide ion conductivity, and the reaction represented by the formula (A) proceeds in the proton conductive solid electrolyte. In other words, protons are not involved in the reaction represented by the following formula (B) in which the reaction of oxide ions proceeds, and therefore the reaction proceeds at the two-phase interface regardless of the use of LSCF or LSCFPd as the air electrode. Thus, if the solid electrolyte with oxide ion conductivity is used, even when the LSCFPd with high reaction activity is used as the air electrode, the amount of reaction resistance component is not significantly decreased compared with the proton conductive solid electrolyte BZM and the air electrode LSCFPd.

$$\tfrac{1}{2}O_2 + 2e^- \rightarrow O^{2-} \tag{B}$$

These findings have not been clarified, and new problems have been found. The findings have novel technical features that offer remarkable operational advantages. The present disclosure more specifically provides the following aspects.

Outline of Present Disclosure

A membrane electrode assembly according to one aspect of the present disclosure includes an electrolyte membrane containing a solid electrolyte and a first electrode bonded to the electrolyte membrane, wherein the solid electrolyte is a compound represented by the composition formula (1): $BaZr_{1-x}M_xO_{3-\gamma}$, M in the composition formula (1) is at least one element selected from the group consisting of Sc, Er, Ho, Dy, Gd, Y, In, Tm, Yb, and Lu, and $0<x<1$ and $0<\gamma<0.5$ are satisfied, and the first electrode contains a lanthanum strontium cobalt iron palladium composite oxide.

This can decrease the reaction resistance between the first electrode, the electrolyte membrane, and the gas phase of air, consequently decrease the reaction resistance of the entire membrane electrode assembly, improve the terminal voltage at the external current of 0 A when used as an electric device, and also consequently improve the terminal voltage at the external current of 0 A or more. This enables the use at a high external current and at a high terminal voltage and can improve the power generation efficiency.

For example, M in the composition formula (1) of the solid electrolyte may be at least one element selected from the group consisting of Y, Tm, Yb, and Lu.

This tends to increase the proton conductivity of the solid electrolyte. This can decrease the resistance of the membrane electrode assembly and improve the power generation efficiency.

Furthermore, for example, the solid electrolyte may satisfy $0.05<x<0.3$ in the composition formula (1).

Satisfying $0.05<x$ in the composition formula (1) improves the performance of the solid electrolyte, and satisfying $x<0.3$ improves the crystal stability of the solid electrolyte. Thus, satisfying $0.05<x<0.3$ in the composition formula (1) can improve both the performance and the durability and stability of the solid electrolyte.

For example, M in the composition formula (1) of the solid electrolyte may be at least one element selected from the group consisting of Lu and Yb.

This tends to increase the proton conductivity of the solid electrolyte and forms less impurities during sintering in the presence of a compound containing Ni. The impurities can decrease carbon dioxide durability. This can improve both the power generation efficiency and reliability.

For example, M in the composition formula (1) of the solid electrolyte may be Yb, and x=0.2 may be satisfied.

This can ensure the performance, carbon dioxide durability, and crystal stability of the solid electrolyte. This can improve the power generation efficiency, reliability, and durability and stability.

For example, the lanthanum strontium cobalt iron palladium composite oxide may be a compound represented by the composition formula (2): $La_{1-m}Sr_mCo_yFe_zPd_{1-y-z}O_{3-\delta}$, and the composition formula (2) may satisfy $0 \le m \le 0.5$, $0.1 \le y \le 0.9$, $0.1 \le z \le 0.9$, $y+z<1$, and $0 \le \delta \le 0.5$.

In the composition formula (2), satisfying $0 \le m$, $0.1 \le y$, and $z \le 0.9$ improves the performance of the first electrode, and satisfying $m \le 0.5$, $y \le 0.9$, and $0.1 \le z$ improves the durability of the first electrode. Thus, in the composition formula (2), satisfying $0 \le m \le 0.5$, $0.1 \le y \le 0.9$, and $0.1 \le z \le 0.9$ can ensure both the performance and durability of the first electrode.

This decreases the overall reaction resistance of the membrane electrode assembly and improves the terminal voltage at the external current of 0 A when the membrane electrode assembly is used as an electric device. This enables the use at a high external current and at a high terminal voltage and can improve the power generation efficiency.

For example, the lanthanum strontium cobalt iron palladium composite oxide may satisfy $0.01 \le 1-y-z \le 0.05$ in the composition formula (2).

In the composition formula (2), satisfying $0.01 \le 1-y-z$ improves the activity of the first electrode as an electrode, and satisfying $1-y-z \le 0.05$ improves the crystal stability of the first electrode. Thus, satisfying $0.01 \le 1-y-z \le 0.05$ in the composition formula (2) can improve both the performance and the durability and stability of the air electrode.

For example, the lanthanum strontium cobalt iron palladium composite oxide may satisfy m=0.4, y=0.38, and z=0.57 in the composition formula (2).

This further improves the performance and durability of the first electrode. This decreases the resistance of the entire membrane electrode assembly and improves the durability and stability.

An electrochemical device according to one aspect of the present disclosure includes the membrane electrode assembly and a second electrode, wherein the electrolyte membrane is located between the first electrode and the second electrode.

Thus, the electrochemical device, which includes the membrane electrode assembly and the second electrode, has small resistance and an improved terminal voltage at the external current of 0 A and even at the external current of 0 A or more. This enables the use at a high external current and at a high terminal voltage and improves the power generation efficiency.

An electrochemical system according to one aspect of the present disclosure includes the electrochemical device.

Thus, the electrochemical system, which includes the electric device, can have improved power generation efficiency.

The electrochemical system may further include a temperature controller. The temperature controller is configured to control the operating temperature of the electrochemical device to be 600° C. or less.

Thus, the electrochemical system including the membrane electrode assembly can have improved power generation efficiency even at the operating temperature of 600° C. or less.

Embodiments of the present disclosure are described below with reference to the accompanying drawings.

The following embodiments are general or specific embodiments. The numerical values, shapes, materials, components, arrangement and connection of the components, steps, and sequential order of steps in the following embodiments are only examples and are not intended to limit the present disclosure. Among the components in the following embodiments, components not described in the independent claims are described as optional components.

The accompanying figures are schematic figures and are not necessarily precise figures. Thus, for example, the scale of each figure is not necessarily the same. Like parts are denoted by like reference numerals throughout the figures. Parts once described are not described again or are simply described thereafter.

In the present specification, the terms describing the relationship between elements, such as parallel, the terms describing the shape of an element, such as rectangular, and the numerical ranges not only refer to their exact meanings but also to substantially the same meanings. For example, the numerical ranges tolerate variations of several percent. The term "thickness direction", as used herein, refers to a direction in which an electrode and an electrolyte membrane are stacked.

First Embodiment

FIG. 1 is a schematic cross-sectional view of a membrane electrode assembly 10 according to a first embodiment. FIG. 1 illustrates a cross section of the membrane electrode assembly 10 in the thickness direction. As illustrated in FIG. 1, the membrane electrode assembly 10 includes an electrolyte membrane 11 containing a solid electrolyte and an air electrode 12 bonded to the electrolyte membrane 11. Thus, the membrane electrode assembly 10 has a multilayer structure including the electrolyte membrane 11 and the air electrode 12. In the present specification, the air electrode 12 is an example of the first electrode.

As described above, the electrolyte membrane 11 contains a proton conductive solid electrolyte. The solid electrolyte is a compound represented by the composition formula (1): $BaZr_{1-x}M_xO_{3-\gamma}$, (BZM). M in the composition formula (1) is at least one element selected from the group consisting of Sc, Er, Ho, Dy, Gd, Y, In, Tm, Yb, and Lu, and $0<x<1$ is satisfied. In the following, M may be referred to as a dopant. In the composition formula (1), $\gamma$ satisfies $0<\gamma<0.5$. The performance of the solid electrolyte tends to be improved as x increases in the composition formula (1). The crystal structure of the solid electrolyte tends to be stable as x decreases in the composition formula (1). To improve both the performance and the durability and stability of the solid electrolyte, the solid electrolyte preferably satisfies $0.05<x<0.3$, more preferably $x=0.2$, in the composition formula (1).

FIG. 2 is a table of the properties of BZMs containing various dopants at x=0.20. More specifically, FIG. 2 lists the dopants in ascending order of ionic radius, whether or not an impurity $BaM_2NiO_5$ is formed by sintering of the BZMs containing dopants in the presence of NiO, and the proton conductivity of the BZMs containing dopants at 600° C. The formation of the impurity $BaM_2NiO_5$ tends to decrease the carbon dioxide durability of the BZMs. "−" in the electrical conductivity results means no measured data. In the composition formula (1), M (a dopant) is preferably at least one element selected from the group consisting of Y, Tm, Yb, and Lu in terms of proton conductivity. In the composition formula (1), M is preferably at least one element selected from the group consisting of Lu and Yb in terms of proton conductivity and less impurity during sintering in the presence of a compound containing Ni.

The solid electrolyte represented by the composition formula (1) is preferably, for example, $BaZr_{0.8}Yb_{0.2}O_{3-\gamma}$ in which M is Yb and x=0.2. This facilitates the production of the membrane electrode assembly 10 with improved power generation efficiency and durability. $\gamma$ satisfies $0<\gamma<0.5$.

The BZMs have proton conductivity, as described above. For example, a BZM in which the element M is Yb and the mole ratio of Zr to Yb is 8:2 has a proton conductivity of approximately 0.011 S/cm at 600° C. The thickness of the electrolyte membrane 11 constituting the membrane electrode assembly 10 may be minimized to decrease the ohmic resistance (that is, IR resistance) of the electrolyte membrane 11.

The air electrode 12 is composed of an oxide ion/electron mixed conductor material containing a lanthanum strontium cobalt iron palladium composite oxide (LSCFPd). The LSCFPd, which contains Pd, may have proton conductivity as well as the conductivity of oxide ions and electrons. The air electrode 12 may be composed only of the LSCFPd or may be composed of the LSCFPd and another oxide ion/electron mixed conductor material. Furthermore, for example, the air electrode 12 may contain an electrolyte material (for example, BZM).

When the air electrode 12 is used as an air electrode of a solid oxide fuel cell, for example, a reaction that electrochemically reduces oxygen in the gas phase occurs. Thus, the air electrode 12 may be a porous body to provide the diffusion path of oxygen and promote the reaction. When the air electrode 12 is a porous body, the porous body may have a porosity of 20% or more and 50% or less by volume, for example.

The LSCFPd is represented by the composition formula (2): $La_{1-m}Sr_mCo_yFe_zPd_{1-y-z}O_{3-\delta}$ and is preferably a compound satisfying $0 \leq m \leq 0.5$, $0.1 \leq y \leq 0.9$, $0.1 \leq z \leq 0.9$, $y+z<1$, and $0 \leq \delta \leq 0.5$ in the composition formula (2). $\delta$ is 0 in a basic composition of the composition formula (2) and may vary in the range of approximately 0 or more and 0.5 or less when the membrane electrode assembly 10 is used. In the composition formula (2), an increase in the value of $1-y-z$ tends to result in an electrode with improved activity, and a decrease in the value of $1-y-z$ tends to result in the LSCFPd with a stable crystal structure. To ensure both the crystal stability and high activity as an electrode of the LSCFPd, the LSCFPd preferably satisfies $0.01 \leq 1-y-z \leq 0.05$, more preferably $m=0.4$, $y=0.38$, and $z=0.57$, in the composition formula (2). The LSCFPd may satisfy $1-y-z=0.05$, $0.19 \leq y \leq 0.38$, and $0.57 \leq z \leq 0.76$, and may satisfy $1-y-z=0.01$, $0.19 \leq y \leq 0.40$, and $0.57 \leq z \leq 0.79$, in the composition formula (2).

In the membrane electrode assembly 10 according to the first embodiment, the air electrode 12 located on one side of the electrolyte membrane 11 can decrease the reaction resistance in the membrane electrode assembly 10. This can improve the power generation efficiency of an electrochemical device including the membrane electrode assembly 10.

Second Embodiment

A second embodiment is described below with reference to the accompanying drawings. The second embodiment mainly describes differences from the first embodiment, and like or corresponding components are denoted by like reference numerals and letters throughout the figures and may not be described again.

An electrochemical device according to the second embodiment includes the membrane electrode assembly according to the first embodiment.

The electrochemical device according to the second embodiment includes a second electrode. The electrolyte membrane is located between the first electrode and the second electrode.

The electrochemical device with this structure can have increased power generation efficiency.

A cell is described below as a specific example of the electrochemical device.

FIG. 3 is a schematic cross-sectional view of a cell 100 according to the second embodiment. FIG. 3 illustrates a cross section of the cell 100 in the shape of a film cut in the thickness direction. The cell 100 according to the second embodiment includes the membrane electrode assembly 10 according to the first embodiment and a fuel electrode 13.

As illustrated in FIG. 3, the electrolyte membrane 11 is located between the air electrode 12 and the fuel electrode 13. In the present specification, the fuel electrode 13 is an example of the second electrode.

The membrane electrode assembly 10 is the same as the membrane electrode assembly 10 according to the first embodiment and is not described here.

The fuel electrode 13 may contain a proton conductive compound represented by the composition formula $BaZr_{1-x}M_xO_{3-\gamma}$ (M is at least one element selected from Lu, Tm, Y, Yb, and In, and $0<x<1$ and $0<\gamma<0.5$ are satisfied) and Ni.

The fuel electrode 13 is preferably a cermet of a mixture of Ni and the BZM that is the solid electrolyte of the electrolyte membrane 11.

Although the electrolyte membrane 11 is located on the fuel electrode 13 in FIG. 3, another layer formed of an ion conductive material different from the electrolyte membrane 11 may be formed between the fuel electrode 13 and the electrolyte membrane 11.

When the fuel electrode 13 is used as a fuel electrode of a solid oxide fuel cell, for example, a reaction that oxidizes hydrogen in the gas phase to protons occurs in the fuel electrode 13. Thus, to promote the oxidation reaction from hydrogen to protons, the fuel electrode 13 may be formed as a joined body of Ni with electronic conductivity and hydrogen oxidation activity and the proton conductive compound. The fuel electrode 13 may be a porous body to provide the diffusion path of gaseous hydrogen. When the fuel electrode 13 is a porous body, the porous body may have a porosity of 20% or more and 50% or less by volume, for example.

When the cell 100 including the membrane electrode assembly 10 is used in a solid oxide fuel cell, for example, electricity is generated by supplying air to one surface of the electrolyte membrane 11 on which the air electrode 12 is located and a gas containing hydrogen to the other surface of the electrolyte membrane 11 on which the air electrode 12 is not located. Thus, when the electrochemical device is a solid oxide fuel cell, the electrolyte membrane 11 should be gas-tight.

Thus, the cell 100 according to the second embodiment, which includes the air electrode 12, the electrolyte membrane 11, and the fuel electrode 13 stacked in this order, can decrease the reaction resistance of the membrane electrode assembly 10 composed of the air electrode 12 and the electrolyte membrane 11 as in the first embodiment and has improved power generation efficiency.

The electrochemical device according to the second embodiment can be used for an electrochemical device, such as a gas sensor, a hydrogen pump, or a water electrolyzer, as well as for a cell. Provided with the membrane electrode assembly according to the first embodiment, the electric device can decrease the reaction resistance in the membrane electrode assembly and have improved sensor sensitivity, pumping power, or electrolysis capacity.

When the cell 100 according to the second embodiment is used in a fuel cell, for example, it is used as the following electrochemical system. First, a raw material, such as a hydrocarbon gas, is supplied to a reformer from the outside through a raw material supply path. The reformer reforms the supplied raw material and produces a hydrogen-containing gas. The hydrogen-containing gas generated in the reformer is supplied to the fuel electrode 13 of the cell 100 through a gas supply path. An oxidant gas supplied from the outside is supplied to the air electrode 12 through another gas supply path. Thus, the cell 100 generates electricity by an electrochemical reaction between hydrogen in the hydrogen-containing gas and oxygen in the oxidant gas thus supplied. Due to the cell 100 according to the second embodiment, the electrochemical system of such a fuel cell can have high power generation efficiency.

The electrochemical system including the electrochemical device according to the second embodiment may further include a temperature controller. The temperature controller controls the operating temperature of the electrochemical device to be 600° C. or less. Due to the membrane electrode assembly according to the first embodiment, such an electrochemical system can have high power generation efficiency even at 600° C. or less. The operation of the electrochemical device at low temperatures can decrease the amount of heat-insulating material. This can decrease the size and cost of the electrochemical device.

EXAMPLES

Although a membrane electrode assembly and an electric device according to the present disclosure are more specifically described in the following examples, the present disclosure is not limited to these examples.

[Production of Membrane Electrode Assembly for Evaluation]

A method for producing a membrane electrode assembly for evaluation in Example 1 and Comparative Examples 1 to 3 is described below. The membrane electrode assembly for evaluation has the same structure as the cell 100 illustrated in FIG. 3.

A slurry of an air electrode material used in Example 1 and Comparative Examples 1 to 3 was prepared for a layered body of an electrolyte membrane and a fuel electrode. The slurry of the air electrode material was then applied to a surface of the electrolyte membrane opposite the fuel electrode in the layered body by screen printing. The coating area of the air electrode material was 0.79 cm$^2$ (Φ10 mm). The layered body coated with the air electrode material was sintered at 950° C. for 2 hours in the air to bake the air electrode on the electrolyte membrane. Thus, a membrane electrode assembly for evaluation was prepared. The electrolyte membrane, the air electrode, and the fuel electrode of the membrane electrode assembly for evaluation had a thickness of 13 μm, 10 μm, and 0.6 mm, respectively. In the fuel electrode, NiO is reduced to Ni at 700° C. for 4 hours or more before power generation. Thus, a mixture of the fuel electrode NiO and a BZM at the time of production becomes a cermet of Ni and the BZM with a specified porosity (that is, 20% or more and 50% or less by volume) at the time of power generation after reduction.

FIG. 4 is a table of materials used and the measurement results of ohmic resistance and reaction resistance at 600° C. of membrane electrode assemblies for evaluation according to the Example and Comparative Examples 1 to 3. FIG. 5 is a table of materials used and the measurement results of terminal voltage, ohmic resistance, and reaction resistance at different temperatures and at an external current of 0 A of the membrane electrode assemblies for evaluation according to the Example and Comparative Examples 1 to 3. The terminal voltage, ohmic resistance, and reaction resistance at the external current of 0 A are indicators of the power generation performance. The power generation efficiency of the cell increases with the voltage during use. Thus, a high terminal voltage at the external current of 0 A is an indicator of improved power generation efficiency. At a high working current, the terminal voltage tends to decrease as the resistance increases. Thus, a low ohmic resistance or reaction resistance is an indicator of improved power generation efficiency.

Regarding an oxide ion/electron mixed conductor material constituting the air electrode, as shown in FIG. 4, an LSCFPd in Example 1 and Comparative Example 2 had a typical composition of $La_{0.6}Sr_{0.4}Co_{0.38}Fe_{0.57}Pd_{0.05}O_{3-\delta}$ ($0 \leq \delta \leq 0.5$). As shown in FIG. 4, an LSCF in Comparative Examples 1 and 3 had a typical composition of $La_{0.6}Sr_{0.4}Co_{0.4}Fe_{0.6}O_{3-\delta}$.

Regarding a solid electrolyte constituting the electrolyte membrane, as shown in FIG. 4, a BZYb in Example 1 and Comparative Example 1 had a typical composition of $BaZr_{0.8}Yb_{0.2}O_{2.90}$. As shown in FIG. 4, a YSZ in Comparative Examples 2 and 3 had a typical composition of $[ZrO_2]_{0.92}[Y_2O_3]_{0.08}$.

The fuel electrode in Example 1 and Comparative Examples 1 to 3 was a cermet of nickel and the solid electrolyte constituting the electrolyte membrane.

[Materials of Electrolyte Membrane and Air Electrode and Production of Layered Body]

The materials constituting the electrolyte membrane and the air electrode, LSCFPd (Pd-containing LSCF6446), LSCF (LSCF6446), BZYb, and YSZ, and a method for producing the layered body of the fuel electrode and the electrolyte membrane are described below.

First, a method for producing the electrolyte membrane BZYb and a fuel electrode green sheet is described below.

The proton conductor material BZYb was prepared by the citrate complex method using a $Ba(NO_3)_2$ powder (manufactured by Kanto Chemical Co., Inc.), a $ZrO(NO_3)_2 \cdot 2H_2O$ powder (manufactured by Kanto Chemical Co., Inc.), and a $Yb(NO_3)_3 \cdot xH_2O$ (manufactured by Kojundo Chemical Laboratory Co., Ltd.) powder as starting materials. More specifically, first, each powder weighed in a predetermined ratio was dissolved in distilled water, and the resulting aqueous solution was stirred. Then, 1.5 equivalents of citric acid monohydrate (manufactured by Kanto Chemical Co., Inc.) and 1.5 equivalents of ethylenediaminetetraacetic acid (EDTA) (manufactured by Kanto Chemical Co., Inc.) with respect to metal cations contained in the aqueous solution were added to the aqueous solution. The aqueous solution was then stirred at 90° C. Subsequently, the pH of the aqueous solution was adjusted to 7 with aqueous ammonia (28%) (manufactured by Kanto Chemical Co., Inc.). After the pH adjustment, the aqueous solution was heated to 95° C. to 240° C. with a hot stirrer to remove the solvent. A solid was thus obtained. The solid was ground in a mortar and was then degreased at approximately 400° C. After the degreasing, the resulting powder was press-formed into a cylindrical shape and was calcined at 900° C. for 10 hours in the air. After the calcination, the coarsely ground powder was put into a plastic container together with zirconia balls, and ethanol was added to the powder. The powder was ground in a ball mill for four days or more. After grinding in the ball mill, the solvent was removed by drying with a lamp. Thus, a $BaZr_{0.8}Yb_{0.2}O_3$ (BZYb) electrolyte material powder was prepared. The $BaZr_{0.8}Yb_{0.2}O_3$ (BZYb) electrolyte material powder, a resin, poly(vinyl butyral), a plasticizer, butyl benzyl phthalate, and solvents, butyl acetate and 1-butanol, were kneaded. A green sheet was formed by a tape casting method. Next, a method for producing the fuel electrode 13 of FIG. 3 in Example 1 and Comparative Example 1 using the BZYb and NiO is described below. The $BaZr_{0.8}Yb_{0.2}O_3$ (BZYb) electrolyte material powder and a NiO powder (manufactured by Sumitomo Metal Mining Co., Ltd.) were weighed at a weight ratio of NiO:BZYb=80:20 (that is, the volume ratio of Ni to BZYb is 69:31). To prepare a green sheet, the electrolyte material powder, the NiO powder, a resin, poly(vinyl butyral), a plasticizer, butyl benzyl phthalate, and solvents, butyl acetate and 1-butanol, were kneaded. A green sheet of the fuel electrode was formed by the tape casting method.

Next, a method for producing a layered body of a fuel electrode and an electrolyte membrane in Example 1 and Comparative Example 1 using the BZYb is described below. The green sheet of the fuel electrode was cut into a predetermined size so as to form a 20 mm×20 mm square (4-C3: with corners chamfered by 3 mm) after sintering on the assumption that the linear shrinkage rate was 22%. Next, a plurality of the cut green sheets were stacked. The electrolyte membrane was stacked on the green sheets. The green sheets with the electrolyte membrane stacked thereon were then hot-pressed at 50 MPa. Thus, a layered body was prepared. The layered body was sintered at 1475° C. for 2 hours in the air. A 20 mm×20 mm square (4-C3: with corners chamfered by 3 mm) half-cell was produced as the layered body of the fuel electrode and the electrolyte membrane. The BZYb was identified to be a single phase by X-ray diffractometry (hereinafter also referred to as XRD). The difference between the component ratio of the BZYb (that is, the component ratio based on the preparation ratio) and the target component ratio (that is, the component ratio based on the actual measurement) was determined to be 1% or less by inductively coupled plasma (hereinafter also referred to as ICP) emission spectroscopy and X-ray fluorescence analysis (hereinafter also referred to as XRF).

Next, a layered body of a fuel electrode and an electrolyte membrane in Comparative Examples 2 and 3 containing the YSZ is described below. A Φ20-mm AEB-2.0 fuel electrode supporting electrolyte half-cell Φ20 manufactured by Nexceris was used as the layered body of the fuel electrode and the electrolyte membrane containing the YSZ. In the fuel electrode supporting electrolyte half-cell, the fuel electrode is composed of a mixture of NiO and the YSZ, and the electrolyte membrane YSZ has a thickness in the range of 7 to 10 μm. The fuel electrode supporting electrolyte half-cell includes a GDC layer 3 to 5 μm in thickness as a reaction preventing layer on the side of the electrolyte membrane on which the air electrode is located.

Next, a method for producing an air electrode material is described below.

A method for producing the Pd-containing LSCF6446 (LSCFPd: $La_{0.6}Sr_{0.4}Co_{0.38}Fe_{0.57}Pd_{0.05}O_{3-\delta}$) used as a material of the air electrode in Example 1 and Comparative Example 2 is described below. First, $La_2O_3$, SrO, $Co_3O_4$, Fe$_2$O$_3$ (all manufactured by Kanto Chemical Co., Inc.), and citric acid were added to pure water for reaction and were mixed with a dinitrodiamine Pd nitric acid solution. Thus, a reaction solution was prepared. The reaction solution was dried at 130° C.

The citric acid contained in the reaction solution after the drying was decomposed by heating in an electric furnace. Subsequently, main sintering was performed at 1200° C. in the air. Thus, an LSCFPd powder was prepared. The LSCFPd was identified to be a single phase by XRD. The difference between the component ratio of the LSCFPd and the target component ratio was determined to be 1% or less by ICP and XRF.

The LSCFPd powder was mixed at a predetermined weight ratio with a vehicle containing a mixture of alcohol and ether. Thus, a mixture was prepared. The mixture was kneaded in a planetary mixer. Thus, a paste of the air electrode material used in Example 1 and Comparative Example 2 was prepared.

Next, a method for producing the LSCF6446 (LSCF: La$_{0.6}$Sr$_{0.4}$Co$_{0.4}$Fe$_{0.6}$O$_{3-\delta}$) used as a material of the air electrode in Comparative Examples 1 and 3 is described below.

First, La$_2$O$_3$, SrO, Co$_3$O$_4$, Fe$_2$O$_3$ (all manufactured by Kanto Chemical Co., Inc.), and citric acid were added to pure water for reaction, and the reaction solution was dried at 130° C. The citric acid contained in the reaction solution after the drying was decomposed by heating in an electric furnace. Subsequently, main sintering was performed at 1200° C. in the air. The LSCF was identified to be a single phase by XRD. The difference between the component ratio of the LSCF and the target component ratio was determined to be 1% or less by ICP and XRF. The LSCF powder was mixed at a predetermined weight ratio with a vehicle containing a mixture of alcohol and ether. Thus, a mixture was prepared. The mixture was kneaded in a planetary mixer. Thus, a paste of the air electrode material used in Comparative Examples 1 and 3 was prepared.

[Measurement of Resistance and Terminal Voltage of Membrane Electrode Assembly For Evaluation]

The resistance of a membrane electrode assembly for evaluation was measured by an alternating-current impedance method. Model 1287 manufactured by Solartron was used for the alternating-current impedance measurement under the temperature conditions shown in FIGS. 4 and 5. An alternating current was applied by changing the frequency from 100 kHz to 0.01 Hz at an amplitude of 10 mV with respect to the terminal voltage at an external current of 0 A. FIG. 6 is a Cole-Cole plot of an example of the alternating-current impedance measurement. FIG. 6 schematically shows resistance components in the alternating-current impedance measurement. As illustrated in FIG. 6, the result of the alternating-current impedance measurement can be illustrated by the Cole-Cole plot in which the real component Z' of the impedance Z (=Z'+jZ") is plotted on the horizontal axis and the imaginary component Z' is plotted on the vertical axis. In the Cole-Cole plot, the ohmic resistance is the intersection point of the arc drawn in the frequency range of approximately 10 kHz to 0.01 Hz and the real axis (Z') on the high-frequency side, and the reaction resistance is the length of the chord between the arc and the real axis (Z'), that is, the length between two intersection points at which the arc crosses the real axis. FIGS. 4 and 5 show the ohmic resistance and reaction resistance results of the measurement.

Figure 7A:
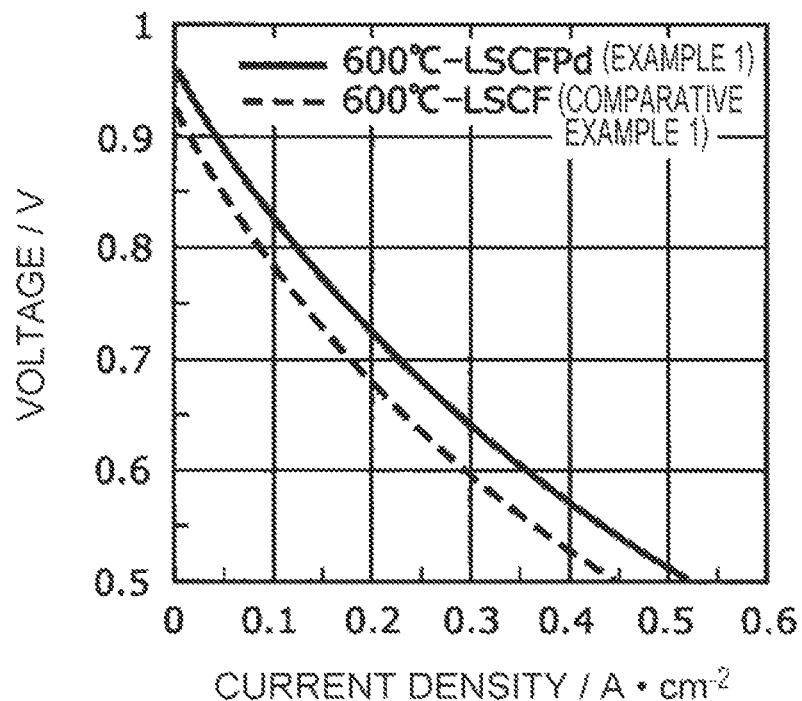
FIG. 7A is a graph of the current-voltage performance of a membrane electrode assembly for evaluation in Example 1 and Comparative Example 1 at 600° C.
Figure 7B:
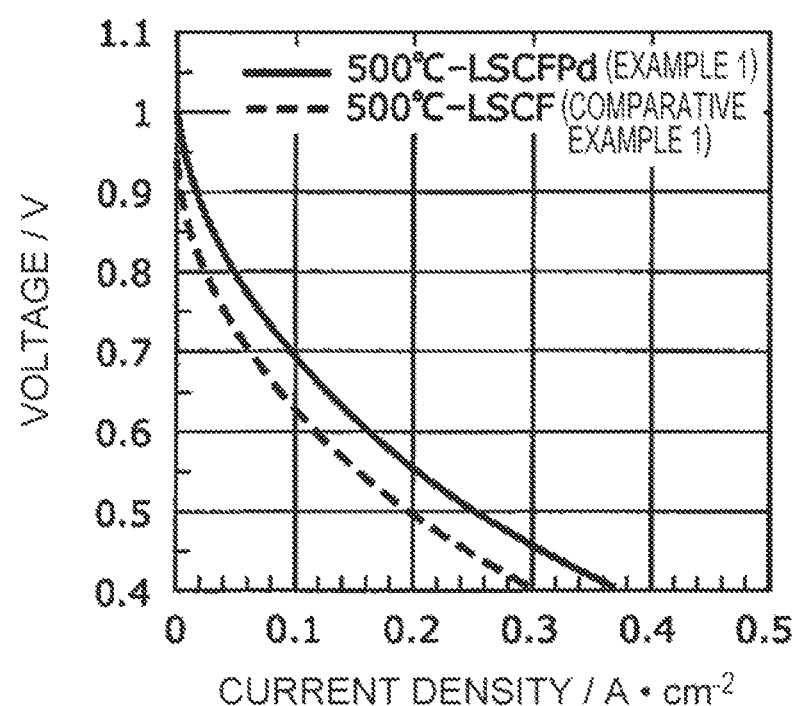
FIG. 7B is a graph of the current-voltage performance of a membrane electrode assembly for evaluation in Example 1 and Comparative Example 1 at 500° C.

The terminal voltage of the air electrode and the fuel electrode in the membrane electrode assembly for evaluation was measured while the air electrode was brought into contact with wet air and the fuel electrode was brought into contact with wet hydrogen gas and while the external current was changed under the temperature conditions shown in FIG. 5. FIG. 5 shows the terminal voltage results at the external current of 0 A. FIGS. 7A and 7B show the measurement results of the current-voltage performance of the membrane electrode assembly for evaluation in Example 1 and Comparative Example 1. FIG. 7A shows the current-voltage performance of the membrane electrode assembly for evaluation in Example 1 and Comparative Example 1 at 600° C. FIG. 7B shows the current-voltage performance of the membrane electrode assembly for evaluation in Example 1 and Comparative Example 1 at 500° C.

As shown in FIG. 5, the membrane electrode assembly for evaluation of Example 1 including the air electrode containing the LSCFPd had a terminal voltage of 0.96 V at the external current of 0 A at 600° C. The membrane electrode assembly for evaluation of Comparative Example 1, which included the same electrolyte membrane as Example 1 and the LSCF air electrode, had a terminal voltage of 0.92 V at the external current of 0 A at 600° C. The membrane electrode assembly for evaluation has a higher terminal voltage at the external current of 0 A and a better result in Example 1 than in Comparative Example 1. The membrane electrode assembly for evaluation in Example 1 and Comparative Example 1 has an ohmic resistance of 0.36 and 0.37 Ωcm$^2$, respectively, at 600° C., which are almost the same. On the other hand, at 600° C., the reaction resistance was 0.79 Ωcm$^2$ in Example 1 and 1.2 Ωcm$^2$ in Comparative Example 1. The membrane electrode assembly for evaluation has a significantly lower reaction resistance and a better result in Example 1 than in Comparative Example 1. The same tendency is observed at a lower temperature of 500° C. The membrane electrode assembly for evaluation has a higher terminal voltage and a lower reaction resistance in Example 1 than in Comparative Example 1. Thus, the membrane electrode assembly for evaluation of Example 1 is more suitable as a membrane electrode assembly containing a proton conductor than the membrane electrode assembly for evaluation of Comparative Example 1. The difference in the terminal voltage and reaction resistance of the membrane electrode assembly containing the proton conductor between Example 1 and Comparative Example 1 is probably due to the reaction of the formula (A). The details are as described above.

As shown in FIGS. 7A and 7B, in the current-voltage performance graph in which the current density is plotted on the horizontal axis and the terminal voltage is plotted on the vertical axis, the line of the membrane electrode assembly for evaluation of Example 1 is higher than the line of Comparative Example 1 at both 500° C. and 600° C. In other words, the membrane electrode assembly for evaluation of Example 1 has a higher voltage and better performance than that of Comparative Example 1 under any current density conditions.

As illustrated in FIG. 5, the membrane electrode assembly for evaluation of Example 1 and the membrane electrode assemblies for evaluation of Comparative Examples 2 and 3, which contained the oxide ion conductor YSZ as the electrolyte membrane, had a terminal voltage of 0.96 V, 1.13 V, and 1.13 V, respectively, at the external current of 0 A at 600° C. The membrane electrode assembly for evaluation has a lower terminal voltage at the external current of 0 A in Example 1 than in Comparative Examples 2 and 3. However, the membrane electrode assembly for evaluation has an ohmic resistance of 0.36 Ωcm$^2$ in Example 1, 2.0 Ωcm$^2$ in Comparative Example 2, and 2.0 Ωcm$^2$ in Comparative Example 3. The membrane electrode assembly for evaluation has a reaction resistance of 0.79 Ωcm² in Example 1, 4.0 Ωcm² in Comparative Example 2, and 5.0 Ωcm² in Comparative Example 3. The membrane electrode assembly for evaluation has a much lower ohmic resistance and a much lower reaction resistance in Example 1 than in Comparative Examples 2 and 3. Thus, the membrane electrode assembly for evaluation of Example 1 has a lower terminal voltage at the external current of 0 A but a much lower ohmic resistance and a much lower reaction resistance than those of Comparative Examples 2 and 3. Consequently, the terminal voltage of the membrane electrode assembly for evaluation of Example 1 is less likely to decrease than those of Comparative Examples 2 and 3 even when the electric current increases. Thus, when the membrane electrode assembly for evaluation is used at approximately 0.8 V as a terminal voltage suitable for actual use, a larger current can be taken out in Example 1 than in Comparative Examples 2 and 3. Thus, the membrane electrode assembly for evaluation of Example 1 has better performance than those of Comparative Examples 2 and 3. Thus, the air electrode and the electrolyte membrane of Example 1 can be used to provide a membrane electrode assembly with higher power generation performance at low temperatures of 600° C. or less than a membrane electrode assembly including an electrolyte membrane with oxide ion conductivity.

As in the comparison between Example 1 and Comparative Example 1, when the BZYb is used in the electrolyte membrane, and the air electrode is changed from the LSCF to the active LSCFPd, the reaction resistance is decreased by 34%. By contrast, as in the comparison between Comparative Examples 2 and 3, when the YSZ is used in the electrolyte membrane, and the air electrode is changed from the LSCF to the LSCFPd, the reaction resistance is decreased by only 20%. This is probably because the use of the proton conductor BZYb promotes the reaction of the formula (A), and the use of the oxide ion conductor YSZ promotes the reaction of the formula (B). The details are as described above.

The membrane electrode assembly 10 according to the present disclosure can be used for an electrochemical device, such as a fuel cell, a gas sensor, a hydrogen pump, or a water electrolyzer.

From the above description, it is obvious to those skilled in the art that the present disclosure includes many modifications and other embodiments. Thus, the above description should be construed as illustrative only and is provided to teach those skilled in the art the best mode for implementing the present disclosure. The details of the structure and/or function can be substantially changed without departing from the spirit of the present disclosure.

A membrane electrode assembly according to the present disclosure can be used for an electrochemical device, such as a fuel cell, a gas sensor, a hydrogen pump, or a water electrolyzer.

What is claimed is:

1. A membrane electrode assembly comprising:
an electrolyte membrane containing a solid electrolyte; and a first electrode bonded to the electrolyte membrane,
wherein the solid electrolyte is a compound represented by a composition formula (1): $BaZr_{1-x}M_xO_{3-\gamma}$,
M in the composition formula (1) is at least one element selected from the group consisting of Sc, Er, Ho, Dy, Gd, Y, In, Tm, Yb, and Lu, and $0.05 < x < 0.3$ and $0 < \gamma < 0.5$ are satisfied,
the first electrode contains a lanthanum strontium cobalt iron palladium composite oxide,
the lanthanum strontium cobalt iron palladium composite oxide is a compound represented by a composition formula (2): $La_{1-m}Sr_mCO_yFe_zPd_{1-y-z}O_{3-\delta}$,
$0 \leq m \leq 0.5$, $0.1 \leq y \leq 0.9$, $0.1 \leq z \leq 0.9$, $y+z<1$, and $0 \leq \delta \leq 0.5$ are satisfied in the composition formula (2), and
the lanthanum strontium cobalt iron palladium composite oxide satisfies $0.01 \leq 1-y-z \leq 0.05$ in the composition formula (2).

2. The membrane electrode assembly according to claim 1, wherein M in the composition formula (1) of the solid electrolyte is at least one element selected from the group consisting of Y, Tm, Yb, and Lu.

3. The membrane electrode assembly according to claim 1, wherein M in the composition formula (1) of the solid electrolyte is at least one element selected from the group consisting of Lu and Yb.

4. The membrane electrode assembly according to claim 1, wherein M in the composition formula (1) of the solid electrolyte is Yb, and x=0.2 is satisfied.

5. The membrane electrode assembly according to claim 1, wherein the lanthanum strontium cobalt iron palladium composite oxide satisfies m=0.4, y=0.38, and z=0.57 in the composition formula (2).

6. An electrochemical device comprising:
the membrane electrode assembly according to claim 1; and
a second electrode,
wherein the electrolyte membrane is located between the first electrode and the second electrode.

7. An electrochemical system comprising the electrochemical device according to claim 6.

8. The electrochemical system of claim 7, further comprising a temperature controller,
wherein the temperature controller is configured to control an operating temperature of the electrochemical device to be 600° C. or less.

* * * * *